(12) United States Patent
Lu (10) Patent No.: US 10,445,046 B2
(45) Date of Patent: Oct. 15, 2019

(54) SYSTEM AND METHOD FOR DISPLAYING DYNAMIC INFORMATION FROM A REMOTE INFORMATION SOURCE AT LOCATIONS WITHIN A PREMISES

(71) Applicant: ABL IP Holding, LLC, Conyers, GA (US)

(72) Inventor: Min-Hao Michael Lu, Castro Valley, CA (US)

(73) Assignee: ABL IP Holding, LLC, Conyers, GA (US)

( * ) Notice: Subject to any disclaimer, the term of this patent is extended or adjusted under 35 U.S.C. 154(b) by 2 days.

(21) Appl. No.: 15/477,975

(22) Filed: Apr. 3, 2017

(65) Prior Publication Data

US 2017/0286041 A1   Oct. 5, 2017

Related U.S. Application Data

(60) Provisional application No. 62/318,149, filed on Apr. 4, 2016.

(51) Int. Cl.
*G06F 3/14* (2006.01)
*G09G 3/00* (2006.01)
*H05B 37/02* (2006.01)

(52) U.S. Cl.
CPC .......... *G06F 3/1423* (2013.01); *G06F 3/1454* (2013.01); *G09G 3/002* (2013.01); *H05B 37/0227* (2013.01); *H05B 37/0245* (2013.01); *G09G 2370/02* (2013.01); *G09G 2370/04* (2013.01); *G09G 2370/16* (2013.01)

(58) Field of Classification Search
None
See application file for complete search history.

(56) References Cited

U.S. PATENT DOCUMENTS

| 7,292,252 B2 | 11/2007 | Matsuda |
| 8,233,097 B2 | 7/2012 | De Vaan |
| 2002/0097978 A1 | 7/2002 | Lowry |
| 2013/0134902 A1* | 5/2013 | Mahale ............... H05B 37/0227 315/297 |
| 2015/0043426 A1 | 2/2015 | Aggarwal |

* cited by examiner

Primary Examiner — Duane N Taylor, Jr.
(74) Attorney, Agent, or Firm — Beeson Skinner Beverley, LLP (57) ABSTRACT

Disclosed is a system for displaying dynamic information from a remote information source at one or more locations within or outside a premises. The system includes a lighting network configured to enable communication of data to and from a plurality of lighting devices and at least one information display node positioned within or outside the premises and connected to the lighting network. The information display node includes a processor configured to receive dynamic information transmitted over the lighting network from a remote source, memory for locally storing image data, and a projector. The processor is configured to generate display data using a combination of the received dynamic information and the stored image data and the projector is configured to project the display data in a visually perceptible form in proximity to the information display node.

17 Claims, 7 Drawing Sheets

SYSTEM AND METHOD FOR DISPLAYING DYNAMIC INFORMATION FROM A REMOTE INFORMATION SOURCE AT LOCATIONS WITHIN A PREMISES

CROSS-REFERENCE TO RELATED APPLICATIONS

This application claims the benefit of U.S. Provisional Application No. 62/318,149 filed Apr. 4, 2016.

BACKGROUND

The present invention relates to information display systems for occupants of buildings and the like, and more particularly to a system and method for displaying dynamic information from a remote information source at one or more locations in a premises using a lighting network.

For premises, such as office buildings, hospitals or other edifices, it is often desirable to be able to display dynamic information to people at various locations within or outside the premises to provide them with instructions or information related to the premises or to alert them to conditions at or within the premises, including emergency conditions. The usefulness of such information is not only tied to the ability to distribute the information quickly to various desired locations associated with the premises, but also to the ability to display the information at the remote locations in a meaningful way. The present invention provides a system and method for utilizing a premises lighting network to communicate dynamic information to remote locations at a premises while overcoming the limitations presented by existing lighting networks to the production of meaningful information displays at such remote locations.

SUMMARY OF INVENTION

A lighting network (i.e. networked lighting system) is a data network that typically connects several intelligent lighting elements, including lighting devices (luminaires, lamps, etc.), lighting controllers and sensors. Such lighting networks typically provide sufficient bandwidth to allow for dynamic information (generally in the form of ASCII text data related to lighting control functions) to be communicated to and from the lighting elements of the network. But typically they do not provide sufficient bandwidth to support transmission of real time image data.

The present invention recognizes the value in using an existing lighting network at a premises to push out dynamic data to various locations within or outside the premises, as the spatial distribution of the lighting elements of the network generally correlates strongly with the areas inside or outside the premises most often frequented by its occupants. The invention permits the use of such a preexisting lighting network to send dynamic information from a remote information source to various locations of high usage within (or outside) a premises and provides for displaying such information at the selected locations in a graphic form without the need for additional network infrastructure or bandwidth.

The invention involves a premises having a lighting network configured to enable the communication of data, such as data about lighting-related functions, to and from a plurality of lighting devices within the premises. According to the invention, one or more information display nodes are positioned within the premises and are connected to the lighting network. Dynamic information capable of being displayed is transmitted from a remote information source to the information display nodes over the lighting network. Each information display node includes a processor configured to receive the dynamic information, memory for storing image data locally at the information display node, and a projector. The processor generates display data using a combination of the received dynamic information and the locally stored image data. Using the projector, this display data can be projected in a visually perceptible form, suitably onto a surface, at a location in proximity to the information display node of the lighting network.

In one example of the invention, the system also includes one or more sensor devices configured to gather sensor data at the premises. The one or more sensor devices are connected to the lighting network and are configured to transfer data to and from devices of the lighting network. In this example, the processor of the information display node is further configured to receive the sensor data transmitted over the lighting network and can generate display data using any combination of the received sensor data, the received dynamic information or the stored image data.

In some examples of the invention, the image data is pre-loaded onto the memory of the information display node, for example at the time of manufacture, commission or installation. In other examples, the image data can be received over the lighting network. This can be done at a time prior to when the processor receives dynamic information and allows for the image data to be slowly loaded onto the memory of the information display node during times of off-peak bandwidth usage.

DETAILED DESCRIPTION OF THE ILLUSTRATED EMBODIMENTS

Figure 1:
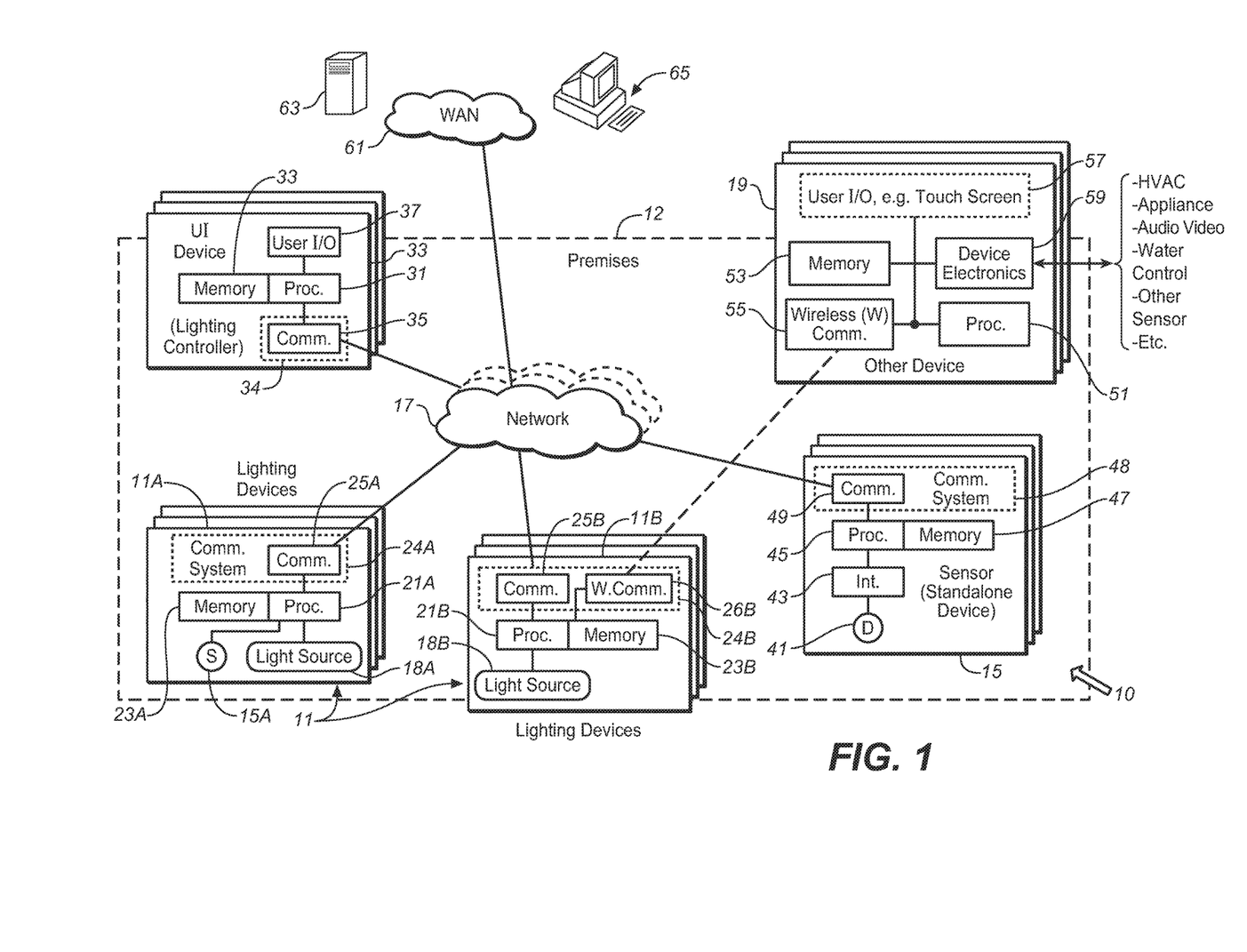
FIG. 1 is a high-level block diagram of an example lighting network (i.e. networked lighting system).

FIG. 1 is a high-level block diagram of a lighting network 10, many elements of which are installed at a premises 12. The premises 12 may be any location serviced for lighting and other purposes by a lighting network of the type described herein. Most of the examples discussed below focus on building installations, although the system may be readily adapted to outdoor lighting systems.

The lighting network 10 may include any number of lighting devices 11, such as fixtures, luminaires and lamps, as well as lighting controllers, such as switches, dimmers, scene controllers and smart control panels. The lighting controllers may be implemented by user interface (UI) devices 13, although UI devices of the lighting network 10 may serve other purposes. The lighting network 10 may also include one or more sensors, such as occupancy sensors, ambient light sensors and temperature sensors. If provided, the sensors may be implemented in standalone sensor elements 15, or the sensors may be incorporated into lighting devices 11 or in UI devices 13. The lighting network elements 11, 13 and 15 are coupled to and communicate via a data network 17 at the premises 12. The lighting network 10 may also provide additional communication capabilities for use by other (non-lighting-related) devices 19 within the premises 12. There may be one overall data network 17 at the premises 12 or the data network 17 may actually be built of separate but interconnected networks represented by the dotted line clouds.

The example lighting network 10 utilizes intelligent lighting devices 11. Hence, each lighting device 11A or 11B has a light source 18A or 18B, a processor 21A or 21B, a memory 23A or 23B and a communication interface system 24A or 24B. One or more lighting devices 11A may also include an integrated sensor 15A.

Each communication interface system 24A or 24B includes a communication interface 25A or 25B configured to enable communication via a link to the data network 17 of the lighting network. The communication interface system 24B may also include a wireless communication interface 26B. Various network protocols may be used for the data communications including, but not limited to, TCP/IP, WiFi, Bluetooth or any known Internet of Things (IoT) protocols such as Google Thread™, Z-Wave™, ZigBee™ or Bluetooth LE. Although not separately shown, many installations of the data network 17 will include one or more routers, and at least one router or other data communication device will serve as a gateway and/or firewall for communications off-premises with a wide area network (WAN) 61, such as an intranet or the public Internet. However implemented, the data network 17 allows intelligent lighting system elements within respective service areas to communicate with each other and/or allows the elements within each of the service areas to communicate with elements in other service areas.

The communication interface 25A or 25B will correspond to the physical, electrical and signaling protocol requirements of the particular technology adopted for the data network 17 in the particular premises 12 or area of the premises 12. For example, if the data network 17 is a wired Ethernet network, each interface 25A or 25B will include an appropriate Ethernet cable connector as well as an Ethernet card to enable the lighting device 11A or 11B to communicate data in electrical Ethernet signals and data protocols over the respective wired Ethernet link.

The UI devices 13 serving as the lighting controllers in this example also are implemented as smart/intelligent devices of the lighting system, with processing and communication capabilities. Hence, each UI device/lighting controller 13 includes a processor 31, a memory 33 and a communication interface system 34, as well as one or more input and/or output elements for physical user interaction as represented generally by user I/O element 37.

Any sensors included in the lighting network 10 also have or are associated with intelligence and communication capabilities. The integrated sensor 15A is integrated into a lighting device 11A; and the processor, memory and communication interface of that device provide the intelligence and communication capabilities associated with that sensor 15A. The stand-alone device sensor 15 has its own individual intelligence and communication capabilities including a processor 45, an associated memory 47 and a communication interface system 48.

The stand-alone device sensor 15 additionally includes a physical condition detector (D) 41, which is the actual device that is responsive to the particular condition to be sensed. The stand-alone device sensor 15 also includes a detector interface circuit (Int.) 43. The circuit 43 provides any drive signal that may be needed by the particular device type of the physical condition detector 41. The detector interface circuit 43 also processes the output signal or signals from the detector 41 to produce a corresponding output, in a standardized data format, for use by the sensor 15 or by any other intelligent lighting system elements of the lighting network 10. The integrated sensor 15A in lighting device 11A may be implemented by a detector and interface circuit analogous to the physical condition detector 41 and the detector interface circuit 43.

The examples show one communication interface in each intelligent lighting system element 11, 13 and 15 for communication with the on-premises data network 17 and, if provided, one wireless communication interface for supporting wireless data communications.

As shown by the description of the lighting network 10 above, the lighting network 10 both provides lighting control services in areas of the premises 12 and provides communications for other devices 19 at the premises. Lighting control services include communication of lighting-related functions such as turning on/off or adjusting lighting devices based on user control or sensory information. Additional communications for other devices 19 may include broadcasting of information, tracking of light use, transmission of sensory data, etc. Essentially, the lighting network 10 with its data network 17 becomes the backbone or hub for data communications for elements 11, 13 and 15 as well as the other devices 19 within the premises.

The other devices 19 that will utilize communication via the lighting network 10 are also intelligent devices in that each device 19 includes a processor 51 and a memory 53. A device 19 may also include one or more input and/or output (I/O) elements 57 for a user interface. The electronics and the programming run by the processor 51 to control operation of each particular device 19 will depend on the particular type of device product.

The other devices 19 may be virtually any type of device, typically not directly related to lighting system operation, but which may utilize data communications, in this case, via the elements and data network 17 of the lighting network 10. By way of just a few examples, the other devices may be components of a heating, ventilation and air conditioning (HVAC) system, any of various appliances found in modern homes or businesses, water controls (e.g. electrically controlled valves or faucets), additional sensors, audio or video hardware, etc.

As will be described more fully below with respect to illustrated embodiments of the invention, the other devices 19 may, in particular, include one or more information display nodes. Such information display nodes utilize the elements and data network 17 of the lighting network 10 to display dynamic information, sensor data, and the like at various locations within the premises 12.

Also shown in FIG. 1 is a host computer or server 63 which can be any suitable network-connected computer, tablet, mobile device or the like programmed to implement desired network-side functionalities at the lighting network 10. User terminal equipment 65 may be implemented with any suitable processing device that can communicate and offer a suitable user interface for controlling elements of the lighting network 10.

Thus, as outlined above, each of the lighting network elements 11, 13, 15 includes a communication interface system 24A, 24B, 34, 48; and each such interface system includes a data communication interface 25A, 25B, 35, 49 configured to enable communication via a link to the data network 17 of the lighting network 10 at the premises 12. The data network 17 also enables communication for other devices 19 at the premises 12.

Figure 2:
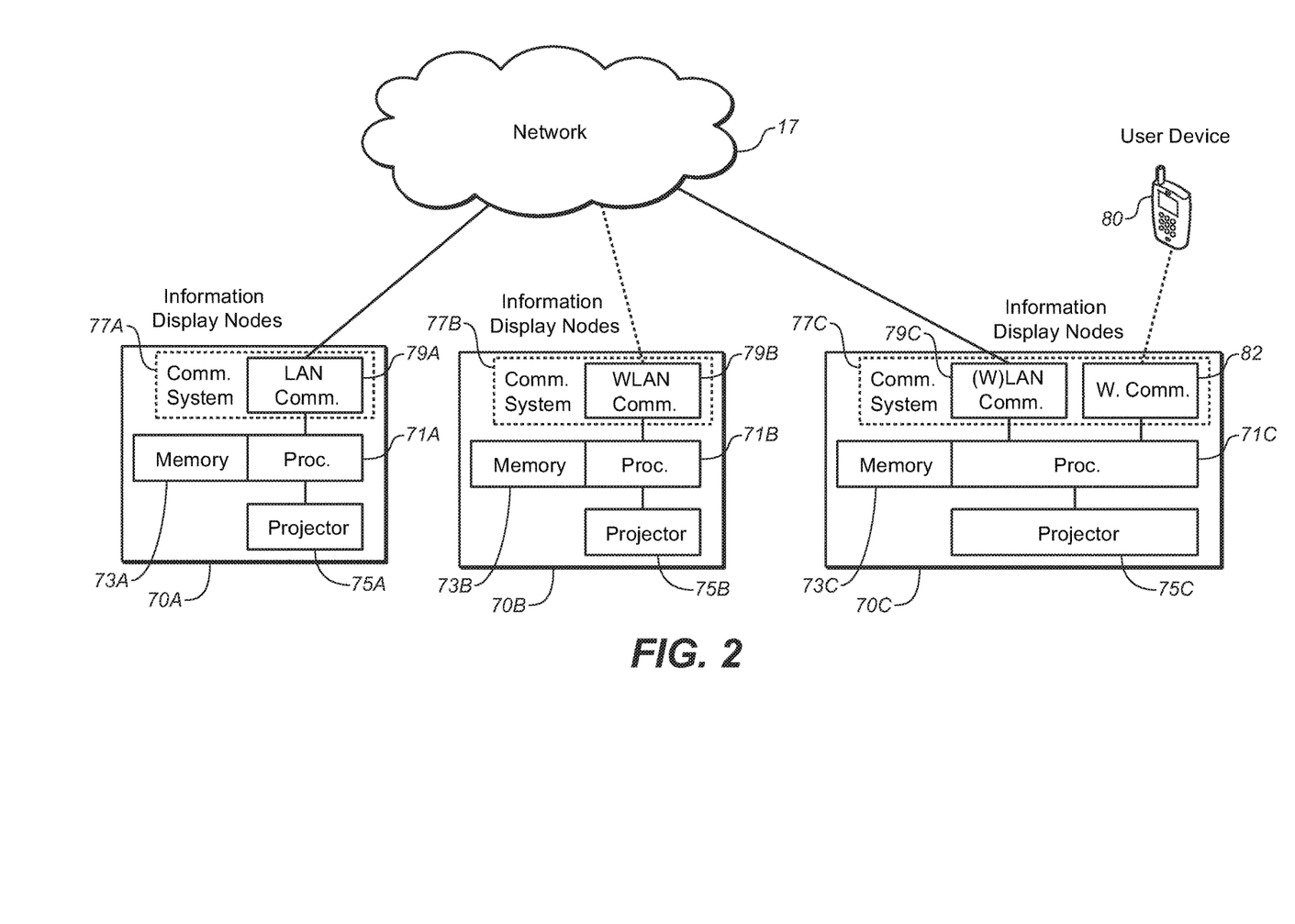
FIG. 2 is a block diagram illustrating example information display nodes connected to the lighting network.

FIG. 2 is a block diagram illustrating example information display nodes 70A, 70B, 70C connected to the lighting network. The information display nodes 70 in this example are also implemented as smart/intelligent devices of the lighting network. Hence, each information display node 70 includes a processor 71A, 71B, 71C, a memory 73A, 73B, 73C and a communication interface system 77A, 77B, 77C. The communication interface systems 77 can include local area network (LAN) 79A or wireless local area network (WLAN) 79B capabilities. Optionally the information display nodes 70 may include additional wireless communication capabilities 82 for communicating with one or more user devices 80 outside of the lighting network, such as a smartphone, tablet or wearable device.

Each information display node 70 also includes a projector 75A, 75B, 75C. The projector 75 can be a device capable of projecting an image onto a nearby surface, or alternatively, can be any other type of visual display device such as a monitor, television set, electronic signage or any kind of luminaire capable of signaling information.

The information display nodes 70 are configured to utilize the elements and data network 17 of the lighting network 10 to display dynamic information, sensor data, and the like at various locations within the premises 12.

Figure 3:
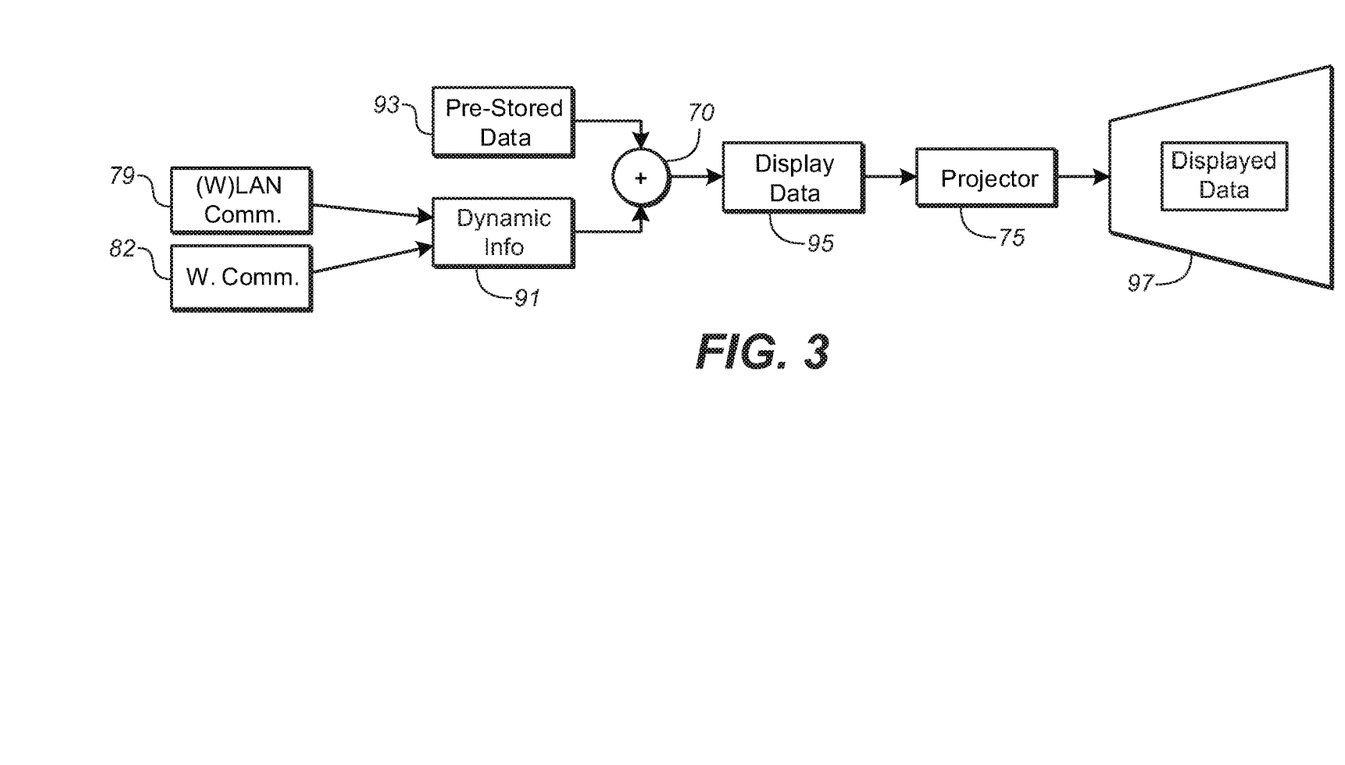
FIG. 3 is a high level flow diagram illustrating the process of generating and projecting dynamic information using an information display node according to the invention.

FIG. 3 is a high level flow diagram illustrating the process of generating and projecting dynamic information using an information display node according to the invention. The information display node 70 receives dynamic information 91 through the communication interface system either by way of LAN/WLAN 79 or other wireless communication 82. The information display node 70 has stored in its memory 73 pre-stored data 93. Pre-stored data can be any time of data, but is preferably a larger, persistent form of data that is not dynamically changing such as static graphical or image data. The dynamic information is combined with the pre-stored data to generate display data 95. For example the display data may be generated by retrieving a static image file from the pre-stored data and modifying the image file in accordance with the dynamic information. The display data is then sent to the projector 75 of the information display node where it is then projected onto a nearby surface.

Figure 4:
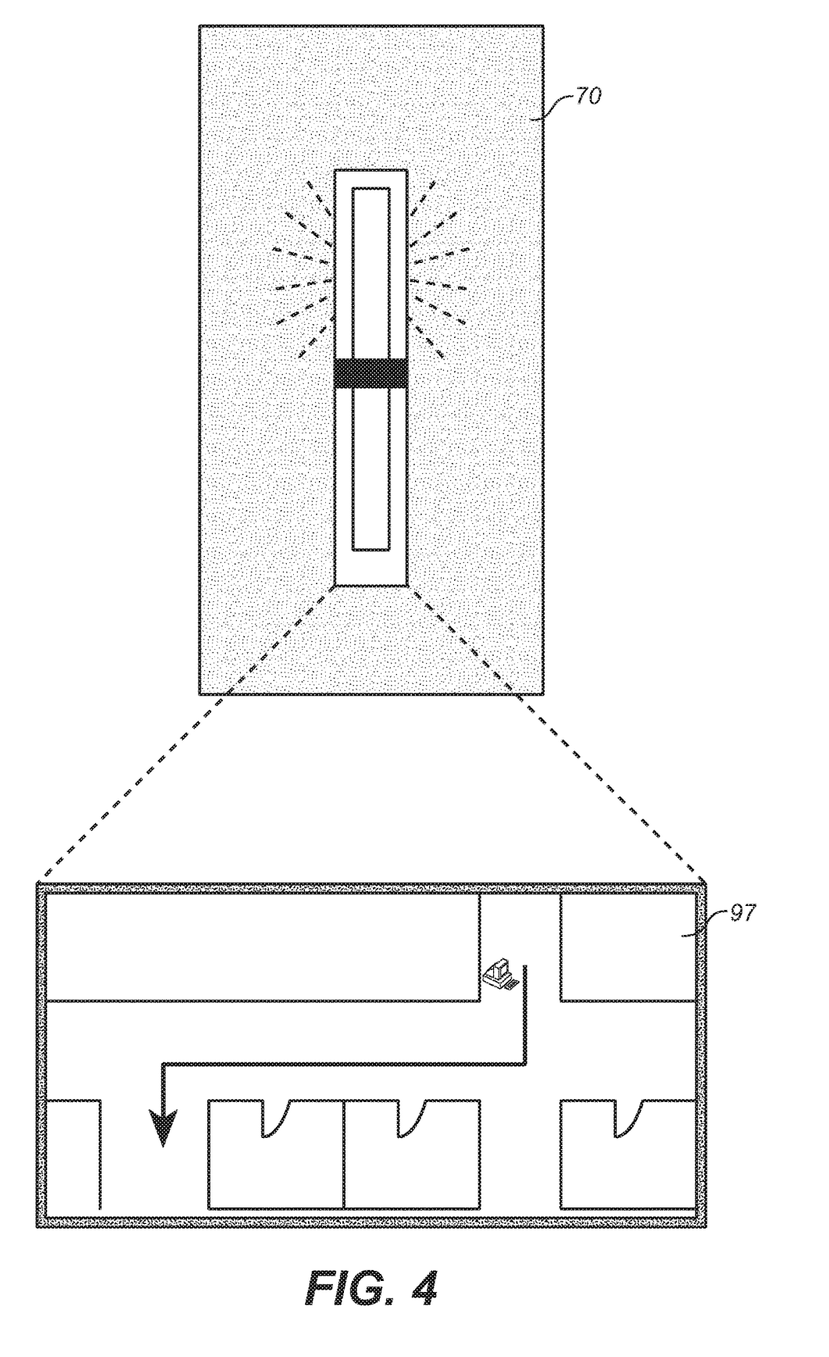
FIG. 4 is a view of an example information display node projecting display data onto a nearby surface.

FIG. 4 shows an example information display node 70 projecting display data 97 onto a nearby surface. In this example, the display data is a combination of static image data in the form of a map and dynamic information in the form of route information. The route information is rendered as a line on top of the map image.

Figure 5:
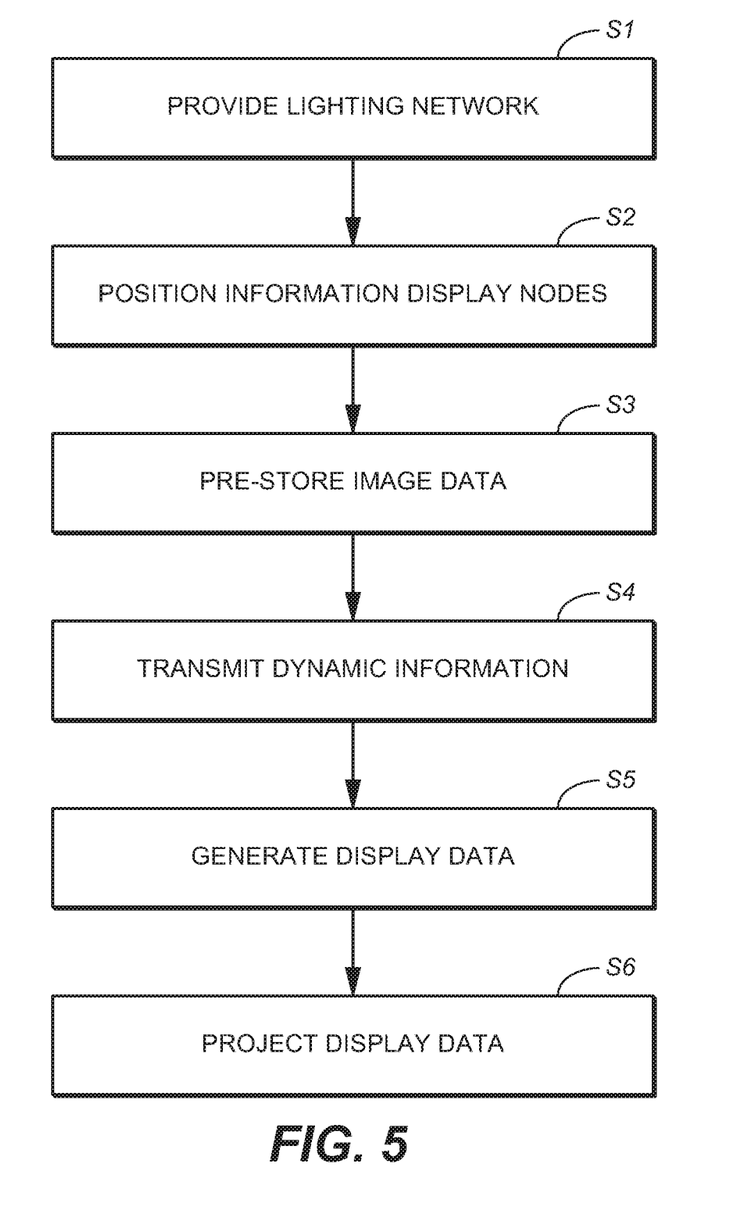
FIG. 5 is a flow diagram illustrating in further detail the process of generating and displaying dynamic information using an information display node according to the invention.

FIG. 5 is a flow diagram illustrating in further detail an example process of generating and displaying dynamic information using an information display node according to the invention. In step S1, a lighting network of the type illustrated in FIG. 1 is provided at a premises, and in step S2, one or more information display nodes of the type illustrated in FIG. 2 are positioned at various locations within the premises and are communicably coupled via the lighting network.

In step S3, image data is pre-stored onto the memory of the information display node. The image data can be pre-stored onto the memory at any time, for example, at the time of manufacturing, commissioning or installation of the information display node. The image data can also be pre-stored onto the memory by transmitting the image data through the lighting network. If there are bandwidth limitations associated with the use of the lighting network to transfer the image data, the image data can be transferred and pre-stored on the memory during times off-peak bandwidth usage or it can be transferred over the lighting network at a transfer rate that is slower than the transfer rate of dynamic information over the lighting network, so as to conserve bandwidth usage.

In step S4, dynamic information is transferred to the information display nodes over the lighting network. In step S5, the processor of the information display node generates display data. The display data can be generated from any combination of the received dynamic information and the pre-stored image data, as well as additional data such as sensor data or data retrieved from one or more user devices. In step S6, the display data is projected onto a nearby surface using the projector of the information display node.

Figure 6:
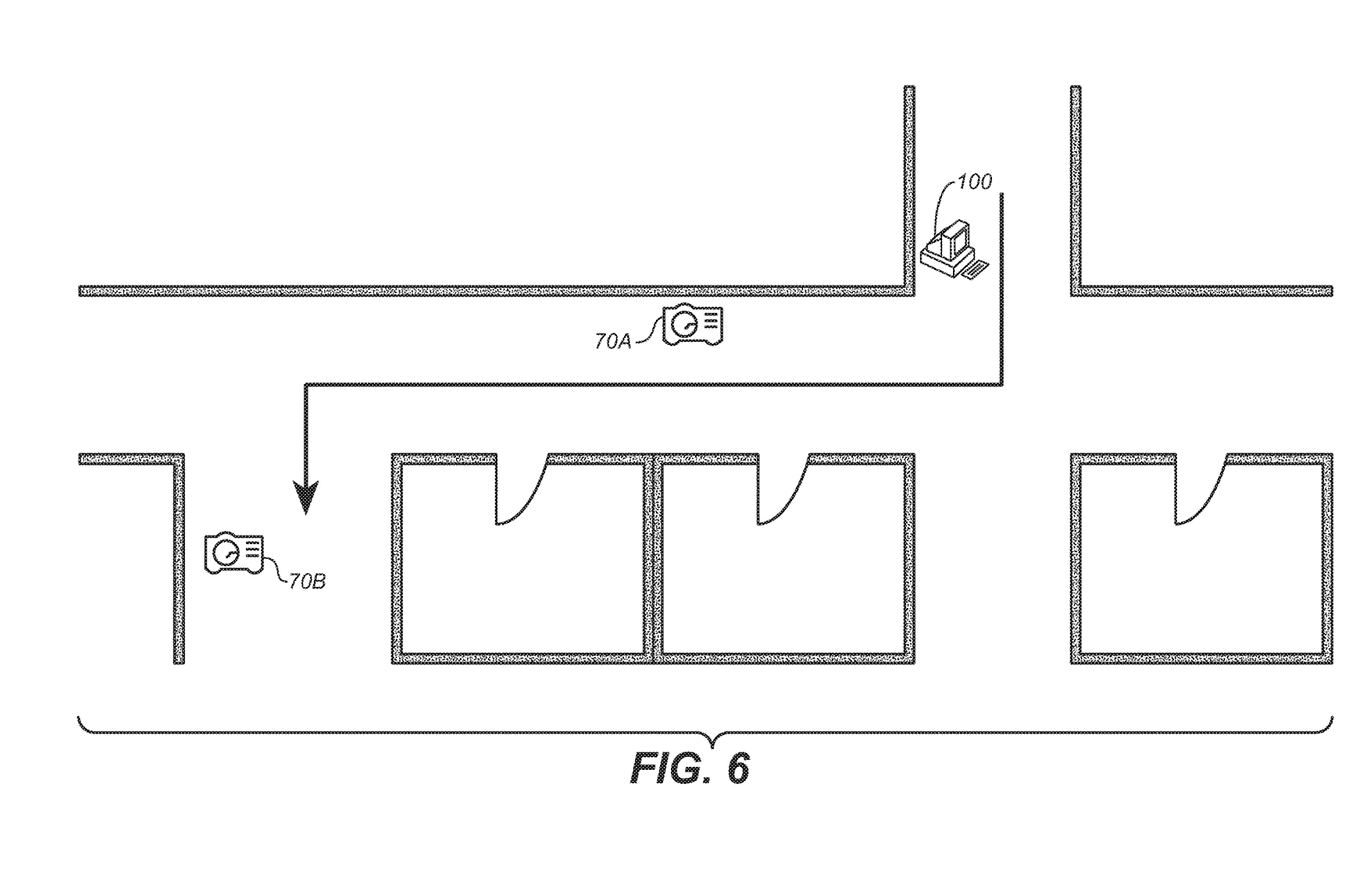
FIGS. 6 and 7 are views for explaining example applications of the invention.

FIG. 6 is an illustration of an example application of the present invention. In this example a user requires directions to a particular location within a building. This example solution can be used in many different types of building environments such as offices buildings, schools, retail stores or hospitals, as well as outdoor environments. For example, the user may be a hospital guest requesting the location of a particular patient at the hospital. The location of the patient is dynamic information subject to changes in real-time. The location of various hospital rooms and hallways, on the other hand, is static information and can be represented, for example, as a static map image.

The hospital guest requests directions to a patient room at kiosk 100. The kiosk is a device connected to a system of the present invention that is installed at the hospital. In addition to the input at the kiosk, the system may also acquire additional information from a user device of the hospital guest, such as GPS data from a smartphone. The system then determines a route from the kiosk to the patient room or from the GPS location of the smartphone to the patient room as dynamic information. This dynamic information is then sent to one or more information display nodes 70a, 70b. The information display nodes generate display data by combining the dynamic information with static image data such as a map of the hospital building that is pre-stored at the information display nodes. The generated display data is in the form of a map image with a line rendered on top of the map to illustrate a path to the patient room. This display data is then projected by the information display nodes onto wall surfaces along the route to the patient room. In alternative embodiments of this example, the display data can be in the form of a simple directory or listing instead of a map image. Similar example applications include directing a library patron to the location of a book or guiding a museum visitor to a particular display. Applications in commerce or retail can also be envisioned, for example, the system of the present invention could be used at a shopping mall to direct customers to particular sales items or in-store events.

Figure 7:
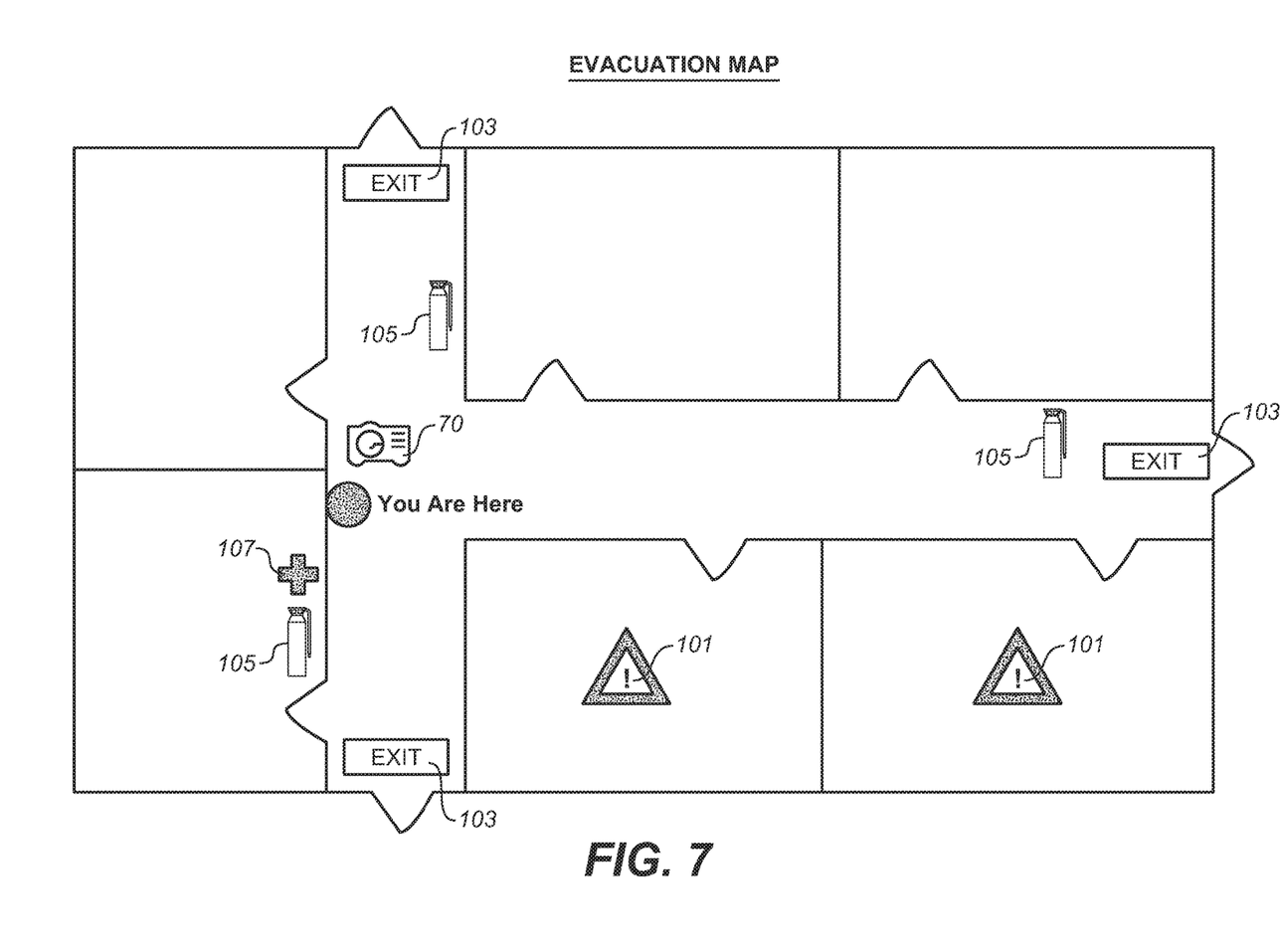

FIG. 7 is an illustration of another example application of the present invention. In this example, emergency information is broadcast to occupants in a building. The dynamic information may include the location of various hazards 101. These hazards can be detected, for example, by sensor devices connected to the system of the present invention. The dynamic information may also include the location of emergency aid such as fire extinguishers 105 or medical services 107 as well as the closest or most accessible emergency exits 103. This dynamic information can be transmitted to one or more information display nodes 70 where it can be combined with static image data, such as a map of the building, in order to generate display data in the form of an evacuation map. The evacuation map can then be projected onto wall surfaces in the building in order to direct occupants along the safest pathways to the various emergency services and emergency exits.

Additional applications of the present invention include visual paging. With visual paging, dynamic information can be presented to a user at various locations visually and/or discreetly as an alternative to an intercom system. Location data from a user's smartphone device or from motions sensors, for example, can be used to determine the closest information display node to the user for purposes of the visual paging. The present invention can also be used for real-time reporting of news, weather or traffic information or to display dynamic advertising at various locations in a premises.

There have thus been described and illustrated certain embodiments for transmitting and displaying information over a lighting network according to the invention. Although the present invention has been described and illustrated in detail, it should be clearly understood that the disclosure is illustrative only and is not to be taken as limiting.

I claim:

1. A system for displaying dynamic information from a remote information source at one or more locations within a building, the system comprising:
   a networked lighting control system within the building configured to enable the communication of data to and from a plurality of lighting devices within the building,
   at least one information display node positioned within the building and connected to the networked lighting control system, wherein the information display node includes:
      a processor configured to receive dynamic non-lighting information transmitted over the networked lighting control system from a remote source within the building,
      memory for locally storing image data, and
      a projector;
      wherein the processor is configured to generate display data using a combination of the received dynamic non-lighting information and the stored image data and wherein the projector is configured to project the display data in a visually perceptible form in proximity to the information display node.

2. The system of claim 1 further comprising:
   one or more sensor devices configured to gather sensor data within the building, wherein the one or more sensor devices are connected to the networked lighting control system and configured to transfer data over the networked lighting control system, and
   wherein the processor of the information display node is further configured to:
      receive the sensor data transmitted over the networked lighting control system; and
      generate display data projected by the projector using any combination of one or more of the received sensor data, the received dynamic information or the stored image data.

3. The system of claim 2 wherein the one or more sensor devices include one of an occupancy sensor or an ambient light sensor.

4. The system of claim 1 wherein the image data stored in the memory of the information display node is transmitted to the information display node over the networked lighting control system at a time prior to when dynamic non-lighting information is transferred to the information display node.

5. The system of claim 1 wherein the image data is pre-stored in the memory of the information display node.

6. The system of claim 1 wherein the projector of the information display node is configured to project the display data onto a surface in proximity to the information display node.

7. A method for displaying dynamic information from a remote information source at one or more locations within a building, wherein the building has a lighting system which includes a plurality of lighting devices configured to illuminate the premises and a networked lighting control system configured to enable the communication of data to and from the plurality of lighting devices, the method comprising:
   positioning at least one information display node within the building and connecting the information display node to the networked lighting control system for receiving dynamic non-lighting information transmitted over the networked lighting control system,
   storing image data at the information display node;
   transmitting from a remote source within the building dynamic non-lighting information to the information display node over the networked lighting control system,
   at the information display node, generating display data using a combination of the received dynamic non-lighting information and the stored image data,
   from the information display node, projecting the display data in a visually perceptible form in proximity to the information display node.

8. The method of claim 7 wherein the display data is projected onto a surface in proximity to the information display node.

9. The method of claim 7 further comprising the steps of:
   receiving, at the information display node, sensor data from one or more sensor devices positioned within the building and connected to the networked lighting control system, and
   generating the display data at the information display node using any combination of one or more of the received sensor data, the received dynamic information or the stored image data.

10. The method of claim 7 wherein the one or more sensor devices include one of an occupancy sensor or an ambient light sensor.

11. The method of claim 7 wherein the image data stored at the information display node is transmitted to the information display node over the networked lighting control system at a time prior to when dynamic information is transmitted to the information display node.

12. The method of claim 7 wherein the image data is pre-stored at the information display node.

13. A method for displaying dynamic information from a remote information source at one or more locations within a building, wherein the building has a lighting system which includes a plurality of lighting devices configured to illuminate the building and a networked lighting control system configured to enable the communication of data to and from the plurality of lighting devices, and wherein the building has at least one information display node connected to the networked lighting control system for receiving dynamic non-lighting information transmitted over the networked lighting control system from a remote source within the building, the method comprising:

storing image data at the information display node;

transmitting dynamic non-lighting information to the information display node over the networked lighting control system from a remote source within the building,     generating, at the information display node, display data using a combination of the received dynamic non-lighting information and the stored image data,     projecting, from the information display node, the display data in a visually perceptible form in proximity to the information display node.

14. The system of claim 1 wherein the dynamic non-lighting information includes location information.

15. The system of claim 1 wherein the dynamic non-lighting information includes route information.

16. The system of claim 1 wherein the dynamic non-lighting information includes real-time news, weather or traffic information.

17. The system of claim 1 wherein the networked lighting control system has sufficient bandwidth to transmit ASCII text data but insufficient bandwidth to transmit real time image data.

\* \* \* \* \*